US011962720B1

(12) United States Patent
Coze et al.

(10) Patent No.: US 11,962,720 B1
(45) Date of Patent: Apr. 16, 2024

(54) INTERACTIVE DIALOG COMMUNICATION VIA CALLBACK

(71) Applicant: Business Objects Software LTD, Dublin (IE)

(72) Inventors: Stephane Coze, Conflans Sainte Honorine (FR); Laurent Le Floch, Cergy (FR)

(73) Assignee: BUSINESS OBJECTS SOFTWARE LTD, Dublin (IE)

( * ) Notice: Subject to any disclaimer, the term of this patent is extended or adjusted under 35 U.S.C. 154(b) by 0 days.

(21) Appl. No.: 18/057,690

(22) Filed: Nov. 21, 2022

(51) Int. Cl.
  *H04M 3/51* (2006.01)
  *H04M 3/523* (2006.01)

(52) U.S. Cl.
  CPC ....... *H04M 3/5166* (2013.01); *H04M 3/5231* (2013.01)

(58) Field of Classification Search
  CPC .......................... H04M 3/5166; H04M 3/5231
  USPC ............ 379/210.01, 202.01, 209.01, 211.01, 379/201.01, 211.03
  See application file for complete search history.

(56) References Cited

U.S. PATENT DOCUMENTS

| | | | | |
|---|---|---|---|---|
| 9,407,594 B2 * | 8/2016 | Altberg | .............. | G06Q 30/0241 |
| 9,525,777 B2 * | 12/2016 | Diana | ................. | H04M 3/5191 |

\* cited by examiner

*Primary Examiner* — Thjuan K Addy
(74) *Attorney, Agent, or Firm* — Fountainhead Law Group P.C.

(57) ABSTRACT

Interactive dialog communication via callbacks is provided by a dialog execution environment executed in response to a selection of a first user interface element in a panel execution environment. The dialog execution environment receives a first set of information including a callback method. A dialog includes a second user interface element selectable to show a second set of information. To obtain this information, the dialog execution environment sends a request for the second set of information to the panel execution environment via the callback method. The panel execution environment sends a request for the second set of information to a server and receives a response including the second set of information. The dialog execution environment receives a response including the second set of information from the panel execution environment and provides the second set of information in a user interface of the dialog.

20 Claims, 9 Drawing Sheets

INTERACTIVE DIALOG COMMUNICATION VIA CALLBACK

BACKGROUND

The present disclosure pertains to computer software and in particular to communication of data with a dialog using a callback.

Certain traditional desktop software applications allowed users to add new functionality through software add-ins. However, these add-ins were typically operating system specific. Many recent software applications integrate cloud functionality and provide access using desktop software and/or a web browser. However, add-ins for web-based software applications may have inherent limitations. There is a need for multi-platform web-based software applications that provide similar functionality as traditional desktop software application add-ins.

The present disclosure addresses these issues and others, as further described below.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein. While certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. Furthermore, the terms "first," "second," "third," "fourth," etc., used herein do not necessarily indicate an ordering or sequence unless indicated. These terms may merely be used for differentiation between different objects or elements without specifying an order.

Certain traditional desktop software applications allowed users to add new functionality through software add-ins. However, these add-ins were typically operating system specific. Many recent software applications integrate cloud functionality and provide access using desktop software and/or a web browser. However, add-ins for web-based software applications may have inherent limitations. There is a need for multi-platform web-based software applications that provide similar functionality as traditional desktop software application add-ins.

To resolve these issues the present disclosure provides techniques that enable interactive communication between a user interface panel of an add-in of a web-based application and a dialog (e.g., popup) of that panel where the dialog and the panel operation in separate execution environments.

Providing interactive communication involves executing a panel execution environment of a web application. The panel may include a first user interface element. It also involves executing a dialog execution environment in response to a selection of the first user interface element. The dialog may be a popup user interface element. The first user interface element is a filter icon or button, and wherein the dialog is a filter selection dialog. The panel execution environment and the dialog execution environment may execute as separate iFrames.

The dialog execution environment may receive a first set of information upon execution. The first set of information is received via an API of the web application. The first set of information may include a callback method. The callback method may include one or more of a state, a store, and a services container.

The dialog may include a second user interface element selectable to show a second set of information. At least a portion of the second set of information may not be included in the first set of information received upon execution. The second set of information may include a presentation format for presenting information in the dialog.

The dialog execution environment may send a first request for the second set of information to the panel execution environment via the callback method. The request may be sent in response to a selection of the second user interface element. In response to receiving the first request from the dialog execution environment, the panel execution environment may then send a second request for the second set of information to a server.

The panel execution environment may receive a first response including the second set of information from the server. The panel execution environment may send a second response including the second set of information to the dialog execution environment. The dialog execution environment may receive a second response including the second set of information from the panel execution environment. Then the dialog execution environment may provide the second set of information in a user interface of the dialog.

The interactive communication between the dialog and the panel are described in further detail below.

Figure 1:
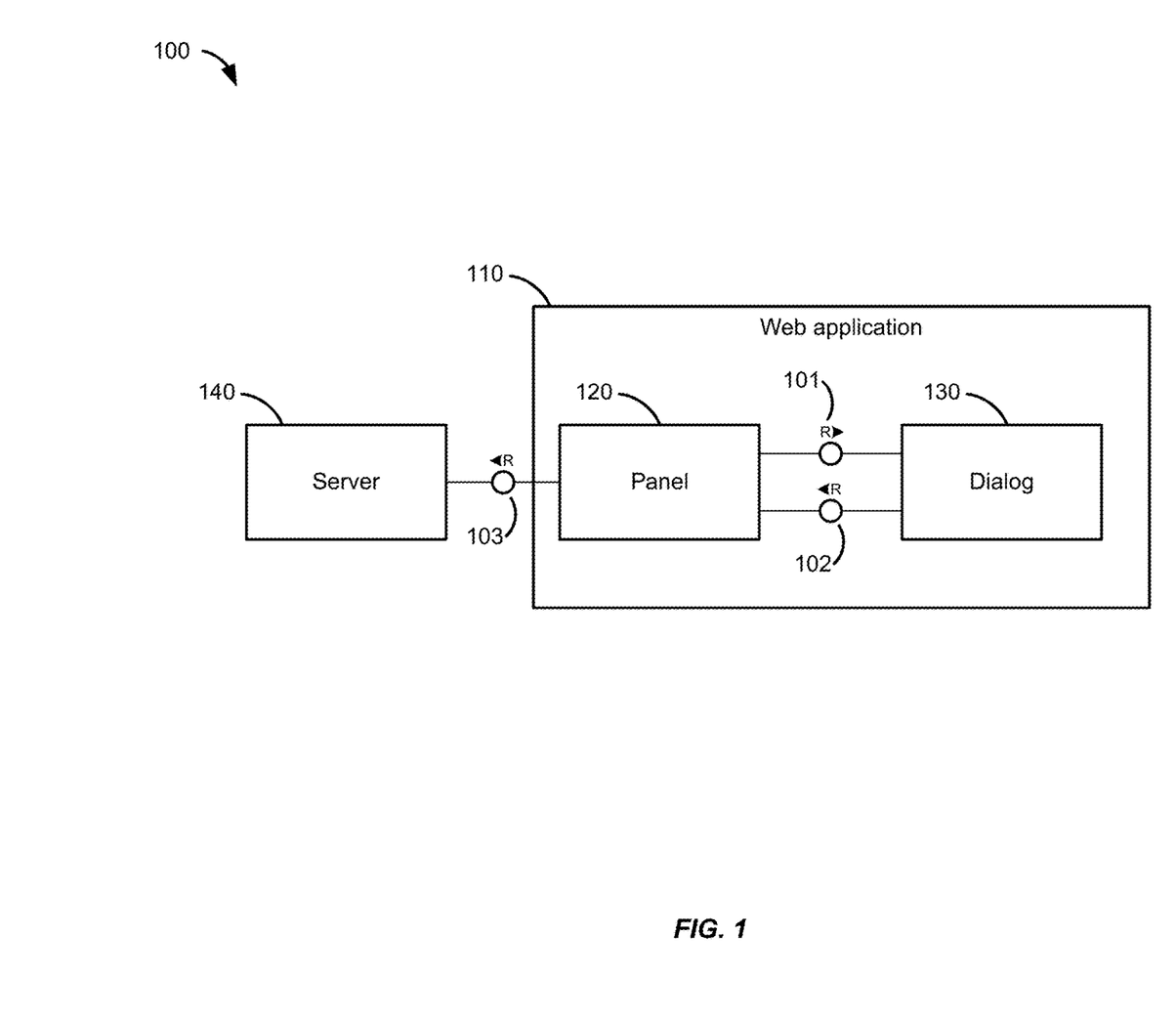
FIG. 1 shows a diagram of a web application including a panel and a dialog, according to an embodiment.

FIG. 1 shows a diagram 100 of a web application 110 including a panel 120 and a dialog 130, according to an embodiment. The web application may be a spreadsheet or other document editing software provided as a web-based application (e.g., accessible via a web browser). The web application may provide an API that allows other software vendors to build Add-ins which will run and behave the same way on desktop and web versions of the web applications. Using this API may allow the developed add-ins to be fully integrated with web application and to interact with it but also introduces some new limitations.

In some cases interactive communication between dialog 130 and the panel 120 (e.g., a side panel or "pane" of the web application) is not supported natively. This limitation may be the consequence that the pane and dialogs are executed in their own iFrame, which means that they run in their own runtime without any native ability to share any variables (only http communication is possible).

However, it would be advantageous to enable interactive communication between the dialog 130 and the panel 120. For instance, user may want to select a different set of members to show a document, define filters, or change the presentation of the dialog.

The dialog 130 may be a popup. Upon initiation, the dialog 130 may take input parameters, receive a startup message from the component which called it (e.g., the panel 120) and then have its own lifecycle until the user closes it by "cancel" button (or "close" icon) or "ok" button. During this time, the Dialog 130 may not be able to interact with the panel 120 nor with the server 140. It implies that all potentially needed information needs to be sent to the dialog 130 at the opening.

To address this limitation and to allow the dialog 130 to interact with the panel 120 and, through it, with the server 140, the present disclosure provides a callback mechanism. At 101, the corresponding callback method is sent to the dialog at its opening. Using this method, the dialog 130 can interact, at 102, with the panel 120, and/or the server 140 to get complementary information and/or trigger action, get results and continue its lifecycle.

This communication mechanism relies on the callback method, which may include the state, the store and the services container in combination with the native capacities of the API.

In the following basic schema, the request 102 illustrates the new capacity offered by this solution: the dialog can initiate a communication with the panel 120 (and through it to the server 140).

Figure 2:
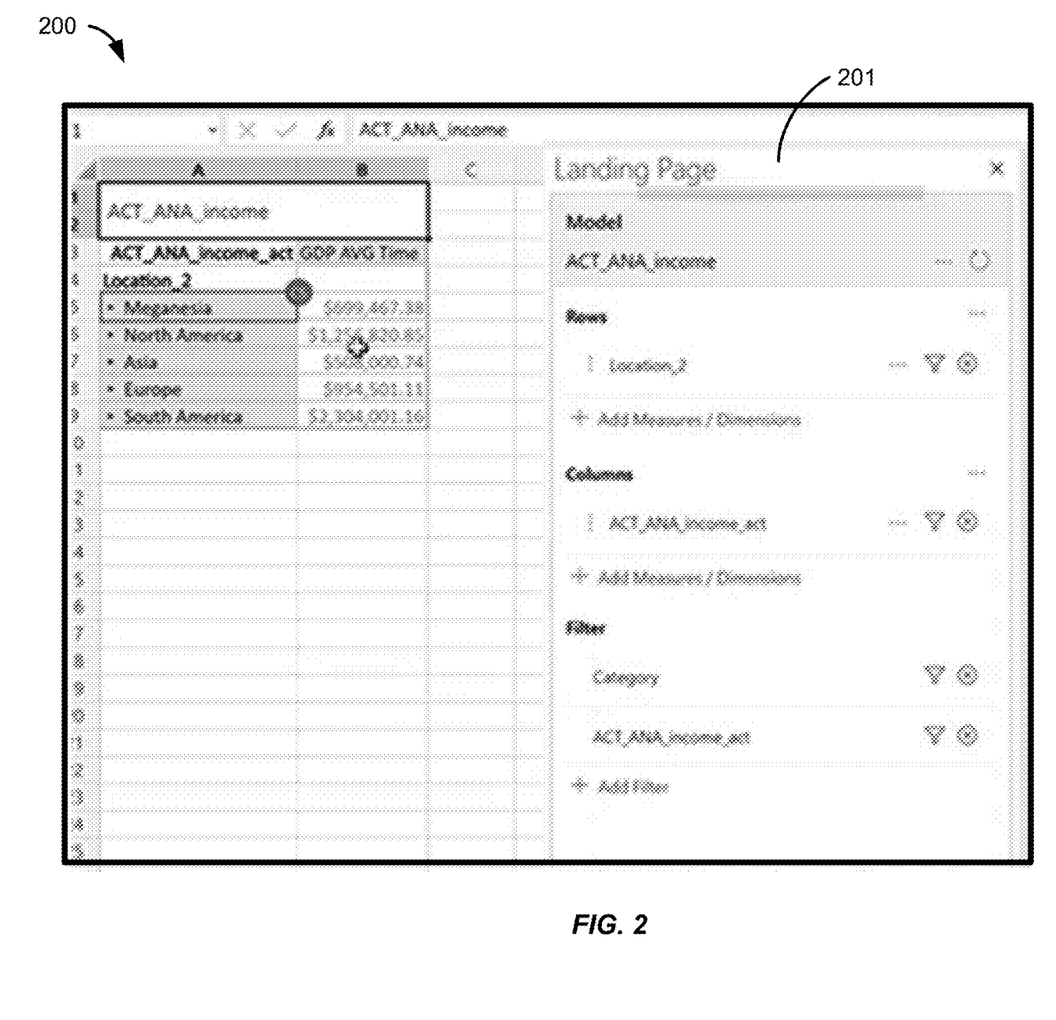
FIG. 2 illustrates a user interface of the web application including the panel and the dialog, according to an embodiment.

FIG. 2 illustrates a user interface 200 of the web application including the panel and the dialog, according to an embodiment. In this example the web application is a spreadsheet application. The web application includes a panel 201 that may be used to filter the data being presented in the spreadsheet. The user may select a user interface element (e.g., icon or button) in the panel 201 to initiation actions. For instance, the user may select the funnel icon to initiate a filter dialog.

Figure 3:
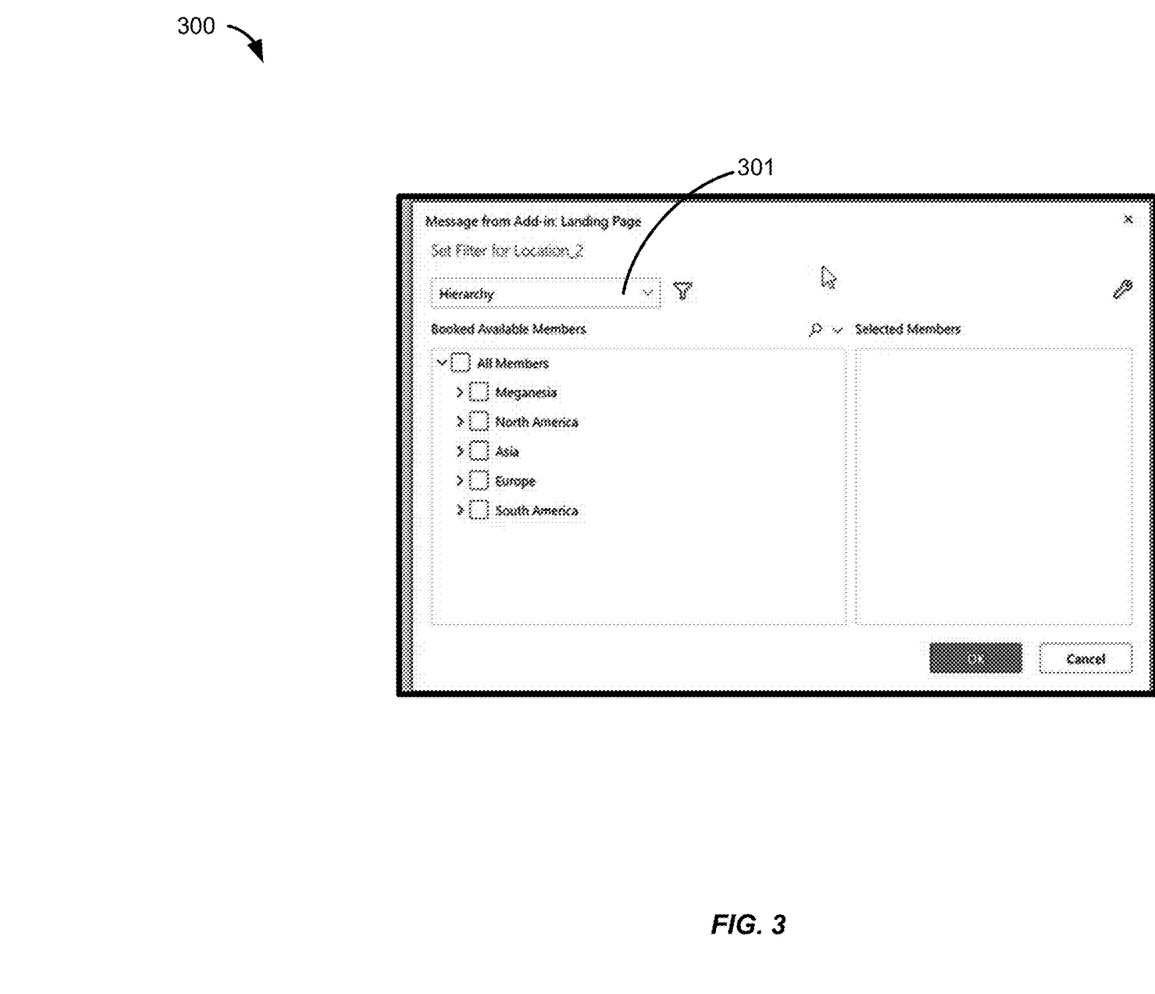
FIG. 3 illustrates the dialog landing page, according to an embodiment.

FIG. 3 illustrates the dialog landing page 300, according to an embodiment. The dialog landing page contains the initial set of information passed to the dialog via the API. The dialog includes user interface elements that can be selected to request new information that was not included in the initiate set of information. For example, the dialog in FIG. 3 is presenting available members in a "hierarchy" presentation. The user may select the drop down menu 301 showing "hierarchy" in order to select a different presentation format, which may require new information. The interactive dialog communication techniques described herein enable such information to be retrieved.

Figure 4:
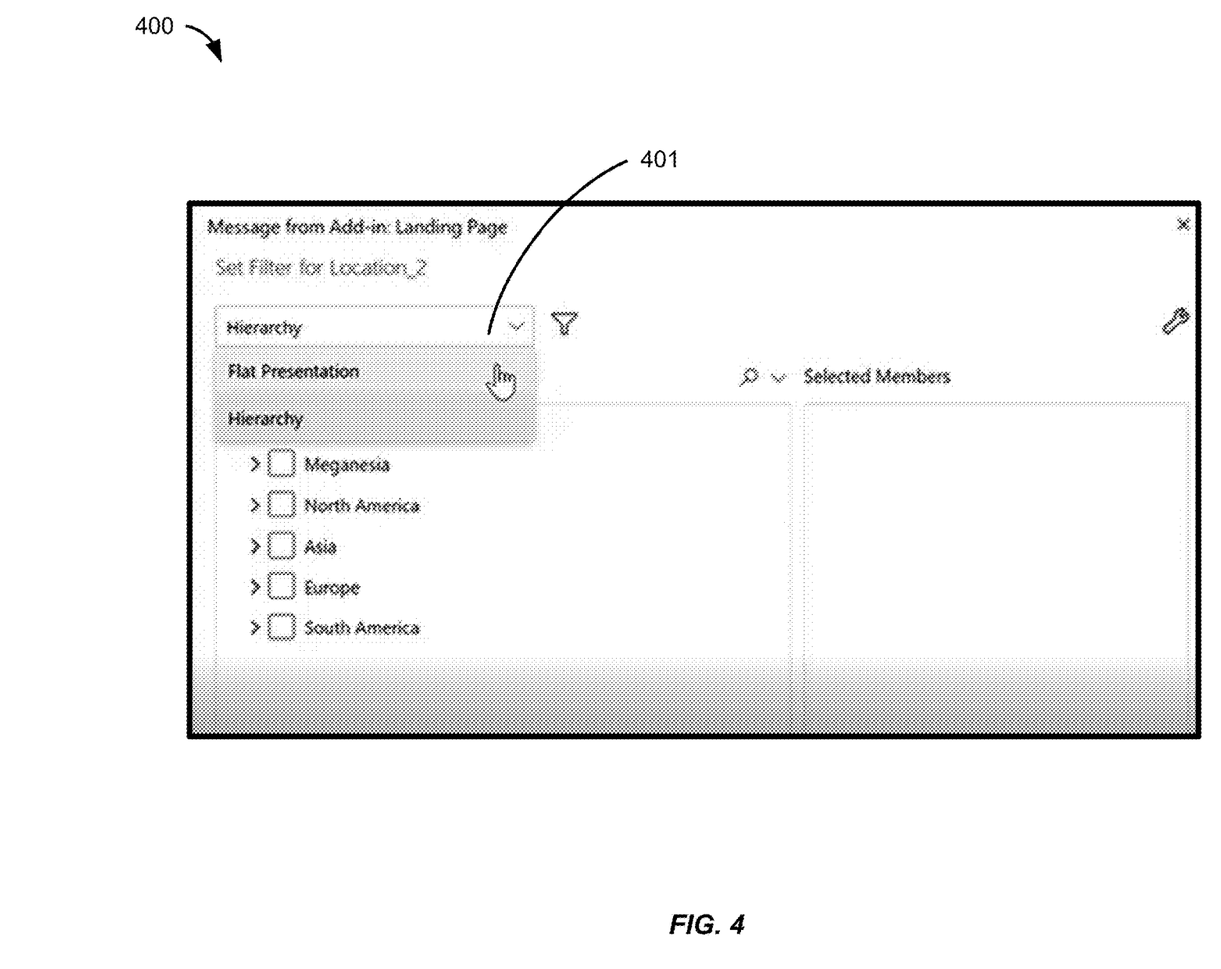
FIG. 4 illustrates a request for new information via the dialog, according to an embodiment.

FIG. 4 illustrates a user interface 400 showing request for new information via the dialog, according to an embodiment. As shown in FIG. 4, the user of the dialog has selected the drop down menu 401 showing "Hierarchy" and the menu shows a different presentation option: "flat presentation." The user may select "flat presentation" which requires new information not provided to the dialog during initiation. Upon selecting "flat presentation" the dialog may use a callback method included in the initiation set of information received upon initiation and use the callback method to communicate a request for "flat presentation" information to the panel. The panel may then send a request for this new "flat presentation" information to a server (e.g., a server hosting information for the add-in). The panel may receive the flat presentation information from the server and send it to the dialog. Such interactive dialog communication is described in further detail below.

Figure 5:
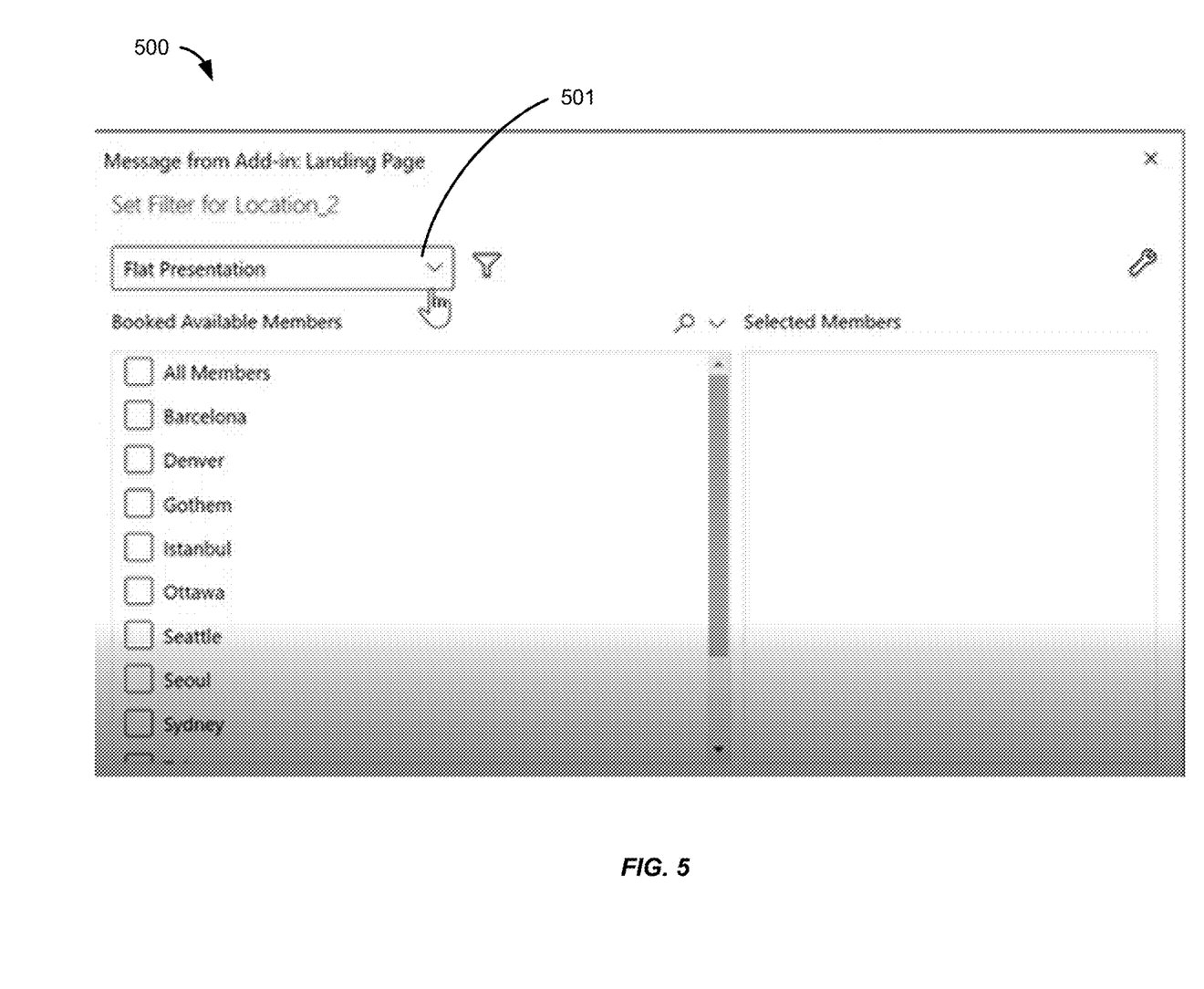
FIG. 5 illustrates new information being presented in the dialog, according to an embodiment.

FIG. 5 illustrates a user interface 500 showing new information being presented in the dialog, according to an embodiment. Upon receiving the "flat presentation" information from the panel, the dialog may update its user interface based on the new information. That is, update the dialog to show the members as a flat presentation instead of as a hierarchy. As described above, the "flat presentation" information was retrieved in response to a user selecting "flat presentation" in the drop down menu 501.

Figure 6:
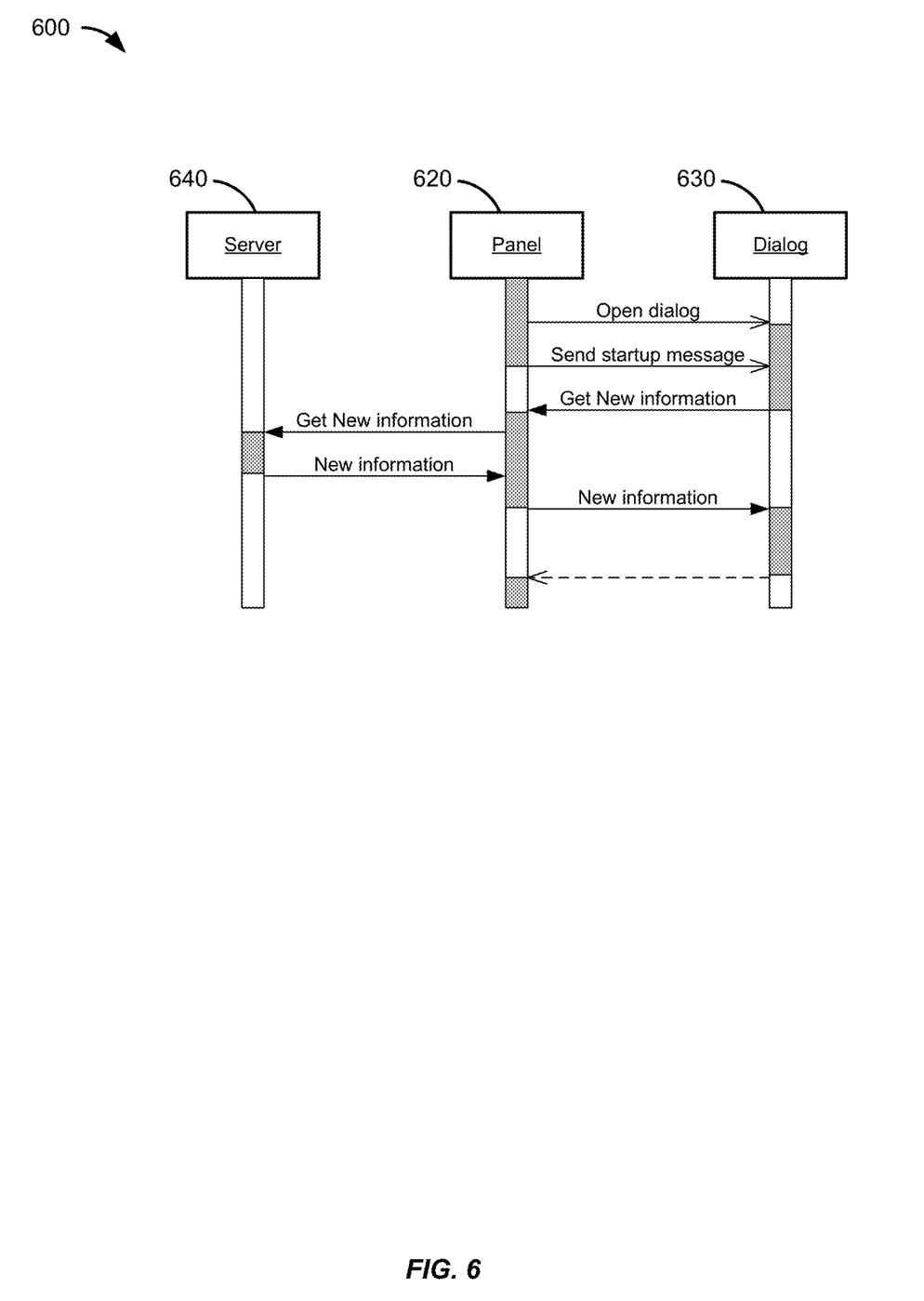
FIG. 6 shows a diagram of a message flow between a panel, a dialog, and a server, according to an embodiment.

FIG. 6 shows a diagram 600 of a message flow between a panel 620, a dialog 630, and a server 640, according to an embodiment. The message flow of FIG. 6 may be used by to enable the dialog 630 to interactively communicate with the panel 620, which may communicate with the server 640, as discussed above.

First, the panel 620 is used to open the dialog 620 (e.g., the user selects a user interface element of the panel 620). Then the panel 620 may send a start up message to the dialog 630. The start up message may include a first set of information as well as a callback method that may be used by the dialog 630 to communicate with the panel 620. The start up message may be sent via an API of the web application.

Upon receiving a selection by a user for new information, the dialog 630 may send a request for new information to the panel 630 using the callback method. The panel 620 may then send a request for the new information to the server 640. The server may provide the new information (e.g., based on a database query for the new information) to the panel 620. Then the panel 620 may provide the new information to the dialog 620 via the callback method.

Thus, the API of the web application provides for an initiate set of information to be sent to the dialog 630 and the callback method enables the dialog 630 to interactively communicate with the panel 620 in response to user requests after the initiate set of information is received.

Further detailed examples of interactive dialog communication techniques are described below with respect to FIGS. 7 and 8.

Figure 7:
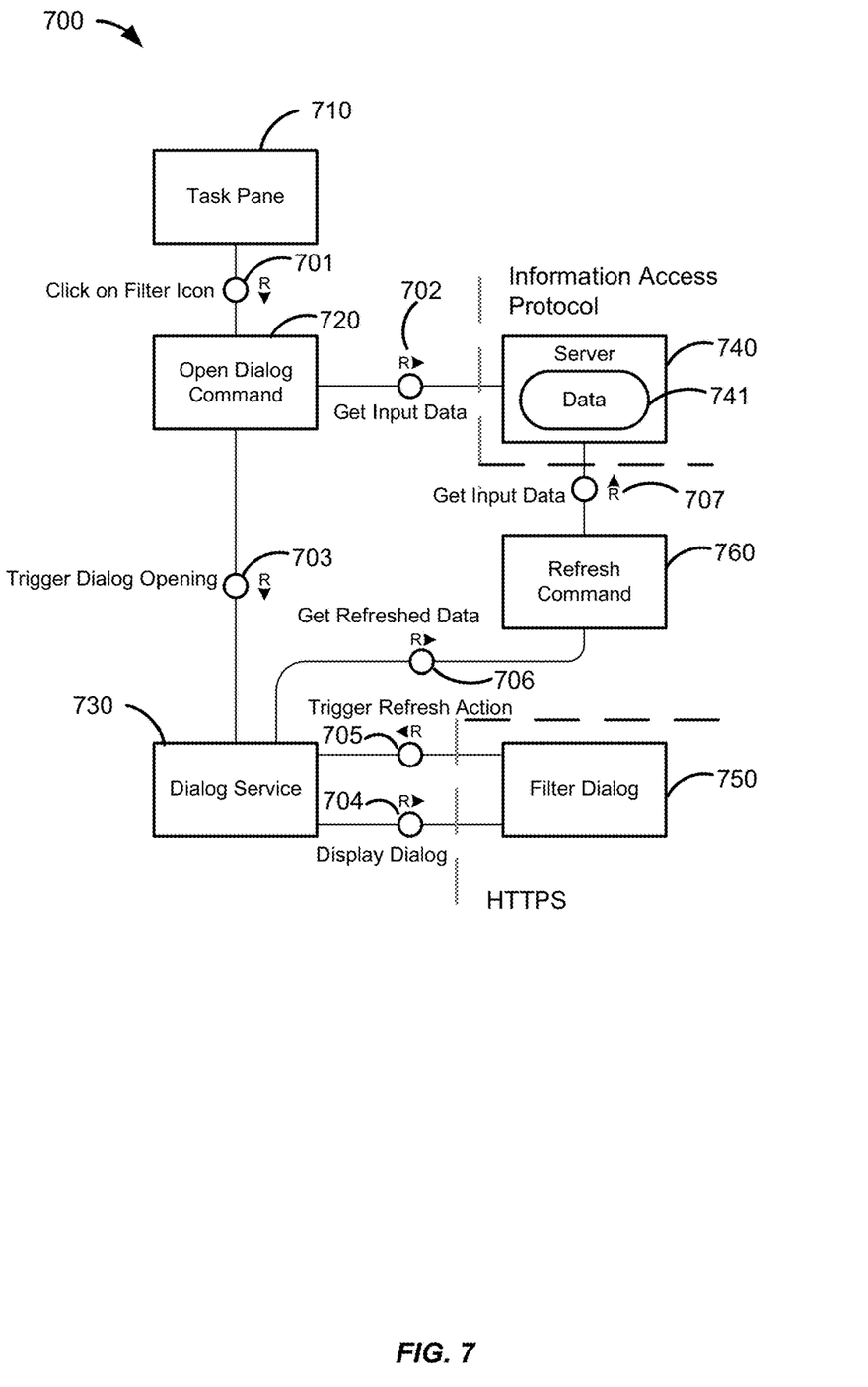
FIG. 7 shows a diagram of components performing interactive dialog communication, according to an embodiment.

FIG. 7 shows a diagram 700 of components performing interactive dialog communication, according to an embodiment. In this example, a cloud-based analytics application uses an add-in for document editing software which has its main UI located in the Task Pane. The components include a task pane 710, an open dialog command 720, a dialog service 730, a server (backend) 740, a filter dialog 750, and a refresh command 760. In this embodiment, communication with the server 740 may use an Information Access protocol. Other protocols may be used in other embodiments. In this embodiment, communication with the filter dialog 750 may use HTTPS. Other protocols may be used in other embodiments.

This diagram 700 shows an overview of requests made between the components. In the task pane 701, a user may click on a filter icon initiating a request 701 to the open dialog command 720. The open dialog command 720 sends a get input data request 702 to the server 740, using the information access protocol for example.

The server 740 includes data 741, which may be stored on a database, for example. The server 740 may provide data in response to the get input data request 702.

The open dialog command component 720 also triggers a dialog opening 703 with the dialog service 730. The dialog service 730 sends a display dialog request 704 to the filter dialog component 750 using HTTPS, for example. As discussed above, the filter dialog may be provided in a separate iframe from the iframe of the task pane 710.

In response to a user selecting an element of the filter dialog (e.g., selecting an option from a menu), the filter dialog 750 may send a trigger refresh action request 705 to the dialog service 730. The request 705 may include an indication of what information is being request (e.g., "flat presentation" as opposed to "hierarchy" presentation as discussed above). Upon receiving the trigger refresh action request 705, the dialog service 710 may send a get refreshed data request 706 to the refresh command component 760. Then the refresh command 760 sends a get input data request 707 to the server 740. This request may be sent using the information access protocol.

Accordingly, the communication of FIG. 7 enables the filter dialog to obtain new information from the server 740 and use that information to refresh the filter dialog with the new information from the server, which was not possible in previous filter dialog implementations. The communication shown in FIG. 7 is described in further detail below with respect to FIG. 8.

Figure 8:
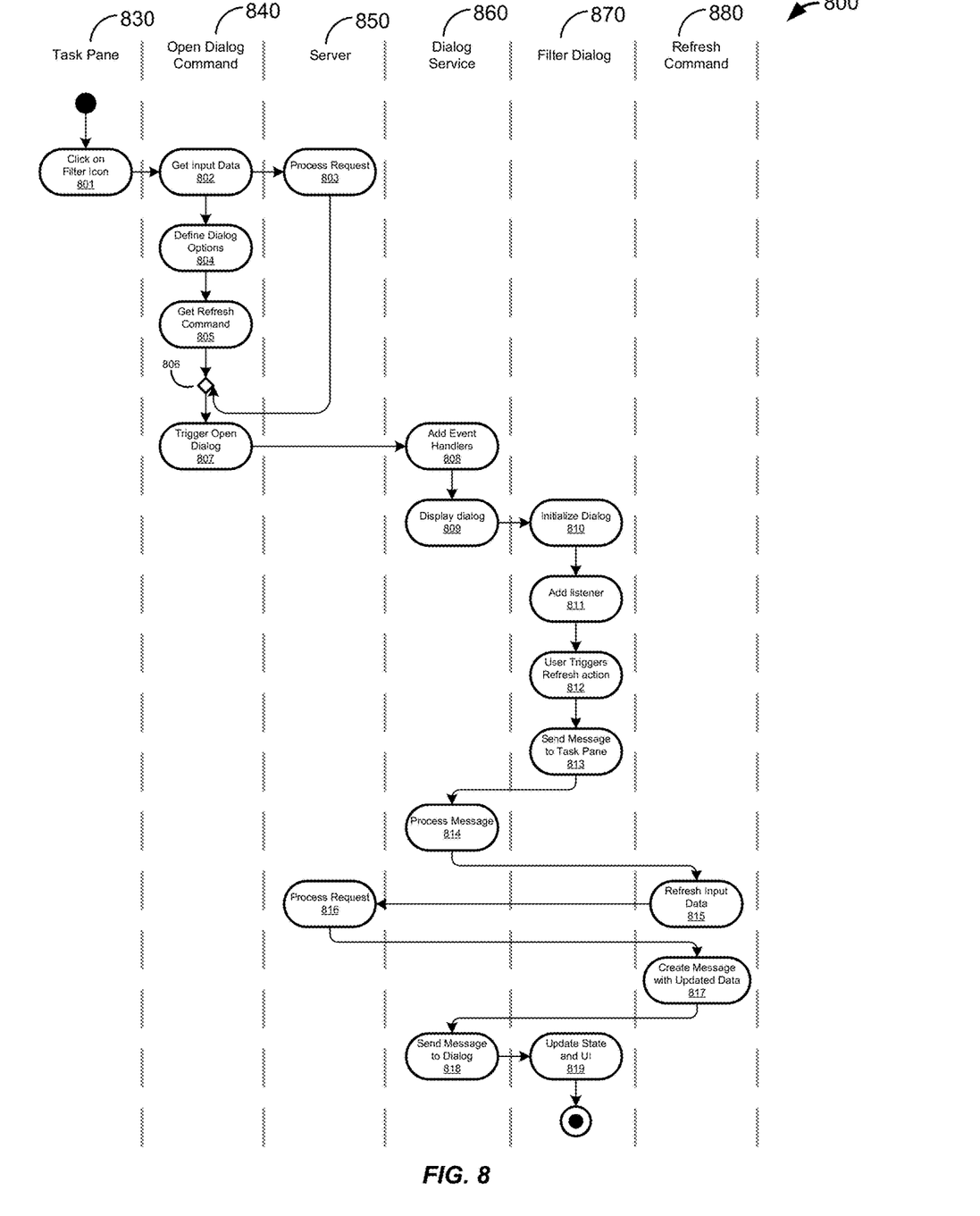
FIG. 8 shows a diagram of an interactive dialog communication process, according to an embodiment.

FIG. 8 shows a diagram 800 of an interactive dialog communication process, according to an embodiment. The process involves the following software components: a task pane 830, open dialog command 840, server 850, a dialog service 860, a filter dialog 870, and a refresh command 880. The process begins from the task pane 830, which may be configured similar to the task panes described above. This example interactive dialog communication process may be used when a user selects a filter icon, which brings up a filter dialog, and then the user selects an element of the user interface which triggers a refresh action similar to the actions performed by the user with respect to the user interfaces shown in FIGS. 2-5 and described above.

At 801, the process begins with a click on a filter icon in the task pane 830. For example, a user may select a filter icon in a panel such as the panel 201 of FIG. 2. The user clicking on a filter icon is just one example. In other embodiments the user may select a different type of icon or the icon may be associated with a different function other than filtering.

At 802, the open dialog command 840 makes a get input data request to the server 850. For example, the input data may be filter information for filtering data corresponding to the filter icon that was clicked on. As discussed above, the filter dialog may present available members in a "hierarchy" presentation. In that example, the input data requested may be information on the hierarchy presentation.

At 803, the server 850 processes the request from the open dialog command 840. For example, the server 850 may provide retrieve information on members from a database. As shown in FIG. 3, this information may include data on members "Meganesia," "North America," "Asia," "Europe," and "South America," as one example. In other embodiments different data will be retrieved when processing the request depending on the particular filter.

At 804, the open dialog command 840 defines dialog options. The dialog options may include static functional parameters, a URL, and size options, for example.

At 805, the open dialog command 840 initiates a get refresh command 805.

At 806, the process waits for the request to be processed by the server 850 before continuing to 807. That is, the process waits for the input data to be received from the server 850.

At 807, the open dialog command 840 triggers opening of the dialog with the dialog service 860.

At 808, the dialog service 860 adds event handlers. The event handlers may be configured to receive messages sent from the dialog to the parent.

At 809, the dialog service 860 initiates displays of the dialog with the filter dialog component 870. FIG. 3 shows an example of a filter dialog in diagram 300.

At 810, the filter dialog component 870 initializes the dialog.

At 811, the filter dialog component 870 adds a listener configured to receive messages from the parent. That is, messages sent from the parent to the dialog.

At 812, the user triggers a refresh action in the filter dialog component 870. Referring to FIG. 3, the user may select a drop down menu 301. As shown in FIG. 4, this opens the drop down menu 401 and the user may select "flat presentation" instead of "hierarchy." This is one example of a user triggering a refresh action. In other embodiments the user may select different elements of the user interface that require additional information beyond the input data already received from the server.

At 813, the filter dialog component 870 sends a message to the task pane 830 via the dialog service 860.

At 814, the dialog service 860 processes the message from the filter dialog component 870 and initiates a refresh of input data with the refresh command 880.

As discussed above, while prior dialog functionality included a basic communication layer, it was not possible to get the application state nor the application services. This means that it was possible to send and receive simple messages but not possible to query the server 850 (backend) or to access the application state.

To address these issues, a refresh command is provided. The refresh command may include a dispatch method and a service container as parameters. In reaction to a message from the dialog, the service is able to call the "Refresh Command" with parameters received in the message. The Refresh Command can get the application state and/or any service and is able to use any service to get the information needed to update the content of the Filter Dialog and it is able to use the dispatch method to change the application state.

Furthermore, an action type is provided in the message sent from the dialog to its parent in order to be able to manage several refresh cases. An example list of supported operations that a refresh of data in the Filter Dialog are: Change hierarchy, Search members, Load hierarchy node by node, Display members without data (by default they are not visible), De/Activate a filter by property to restrict the list of members. In other embodiments other operations can refresh data. The refresh command is described in further detail below.

At 815, the refresh command 880 initiates a refresh of the input data by sending a request with the data to the server 850. In the example of FIG. 4, the request sent to the server 850 is for information on "flat presentation" of the filter.

At 816, the server 850 processes the data received from the refresh command 880 and returns a response including updated data to the refresh command 880.

At 817, the refresh command creates a message with updated data from the server 850. The message with the updated data is provided to the dialog service 860 from the refresh command 880.

At 818, the dialog service 860 sends the message to the filter dialog 870.

At 819, the filter dialog 870 updates its state and the filter dialog user interface. For example, FIG. 5 shows the information regarding the "flat presentation." That is, the members are no longer shown in the hierarchy presentation: "Meganesia," "North America," "Asia," "Europe," and "South America." Instead, the members are shown in the flat presentation: "All members" (a check box to select all members), "Barcelona," "Denver," "Gothem," "Istanbul," "Ottawa," "Seattle," "Seoul," "Sydney," as shown in FIG. 5. This is just an example user interface. In other embodiments the information presented will be different depending on the particular software functions and data retrieved from the server 850. This ends the process.

Thus, the refresh command can be used to provide interactive dialog communication, enabling a dialog in a separate iframe from the iframe of the task pane to communicate with the server to receive new information that is used to update the dialog (refreshing it). This new functionality is advantageous as it allows the user to see new information or have the same information presented in a different way from within the same dialog iframe, providing an improved user interface experience.

Figure 9:
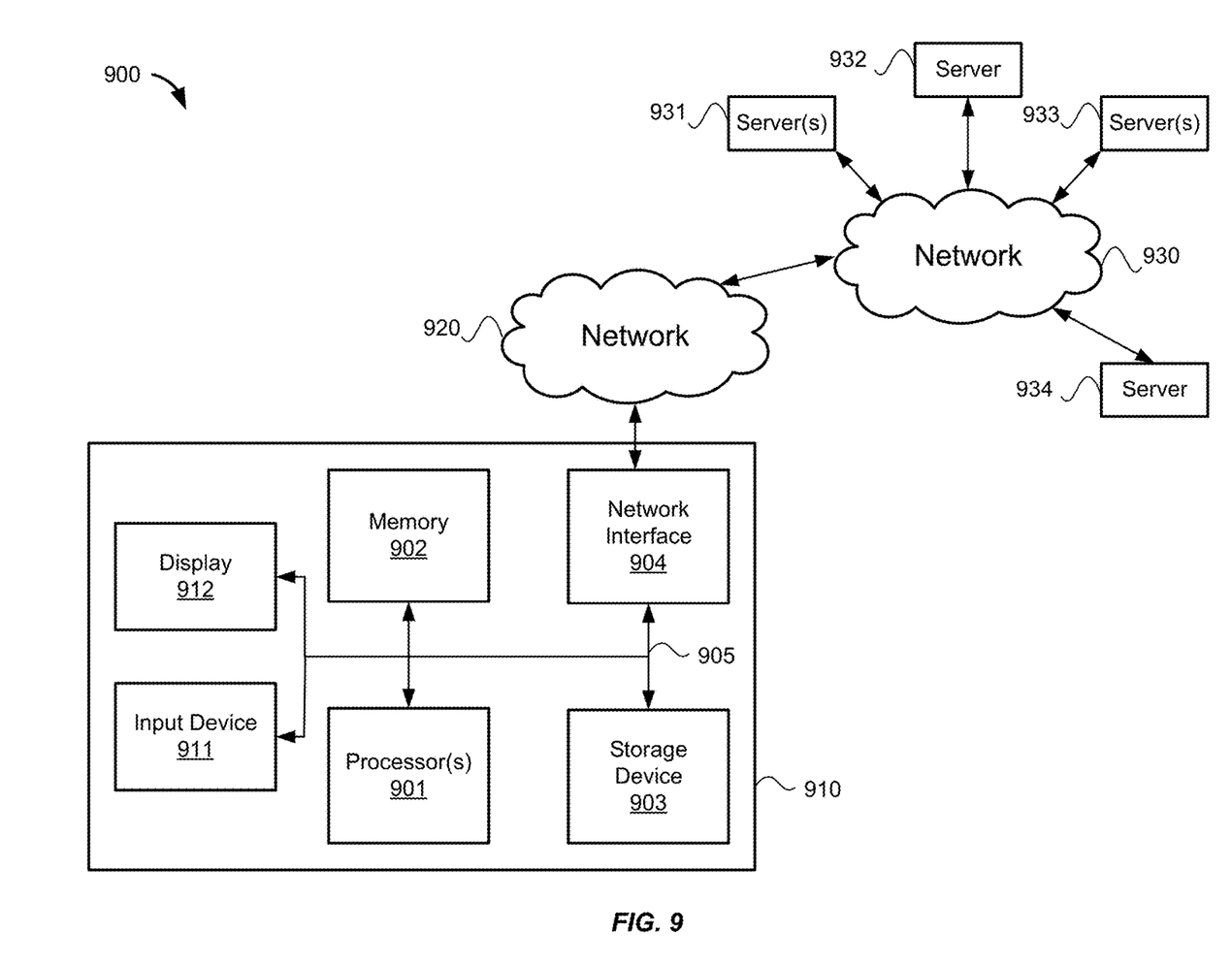
FIG. 9 shows a diagram of hardware of a special purpose computing machine for implementing systems and methods described herein.

FIG. 9 shows a diagram of hardware of a special purpose computing machine for implementing systems and methods described herein. The following hardware description is merely one example. It is to be understood that a variety of computers topologies may be used to implement the above described techniques. The hardware shown in FIG. 9 may be used to implement the computer systems and computer software (computer reprogram code) described herein.

The computer system 910 includes a bus 905 or other communication mechanism for communicating information, and one or more processor(s) 901 coupled with bus 905 for processing information. The computer system 910 also includes a memory 902 coupled to bus 905 for storing information and instructions to be executed by processor 901, including information and instructions for performing some of the techniques described above, for example. This memory may also be used for storing programs executed by processor(s) 901. Possible implementations of this memory may be, but are not limited to, random access memory (RAM), read only memory (ROM), or both. A storage device 903 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 903 may include source code, binary code, or software files for performing the techniques above, for example. Storage device and memory are both examples of non-transitory computer readable storage mediums.

The computer system 910 may be coupled via bus 905 to a display 912 for displaying information to a computer user. An input device 911 such as a keyboard, touchscreen, and/or mouse is coupled to bus 905 for communicating information and command selections from the user to processor 901. The combination of these components allows the user to communicate with the system. In some systems, bus 905 represents multiple specialized buses, for example.

The computer system also includes a network interface 904 coupled with bus 905. The network interface 904 may provide two-way data communication between computer system 910 and a network 920. The network interface 904 may be a wireless or wired connection, for example. The network 920 may be a local area network or an intranet, for example. The computer system 910 can send and receive information through the network interface 904, across the network 920, to computer systems connected to the Internet 930. Using the Internet 930 the computer system 910 may access data and features that reside on multiple different hardware servers 931-934. The servers 931-934 may be part of a cloud computing environment in some embodiments.

Example Embodiments

Example embodiments of interactive dialog communication via callbacks are provided below.

Some embodiments provide a computer system. The computer system comprises one or more processors and one or more machine-readable medium coupled to the one or more processors. The one or more machine-readable medium store computer program code comprising sets of instructions executable by the one or more processors. The sets of instructions are executable to execute a panel execution environment of a web application, the panel including a first user interface element. The sets of instructions are further executable to execute a dialog execution environment for a dialog in response to a selection of the first user interface element. The dialog execution environment receiving a first set of information upon execution. The dialog including a second user interface element selectable to show a second set of information, where at least a portion of the second set of information is not included in the first set of information received upon execution. The first set of information includes a callback method.

The sets of instructions are further executable to send, by the dialog execution environment, a first request for the second set of information to the panel execution environment via the callback method. The request being sent in response to a selection of the second user interface element.

The sets of instructions are further executable to send, by the panel execution environment, a second request for the second set of information to a server.

The sets of instructions are further executable to receive, by the panel execution environment, a first response including the second set of information from the server.

The sets of instructions are further executable to receive, by the dialog execution environment, a second response including the second set of information from the panel execution environment.

The sets of instructions are further executable to provide, by the dialog execution environment, the second set of information in a user interface of the dialog.

In some embodiments of the computer system, the callback method includes one or more of a state, a store, and a services container.

In some embodiments of the computer system, the panel execution environment and the dialog execution environment are separate iFrames.

In some embodiments of the computer system, the dialog is a popup user interface element.

In some embodiments of the computer system, the first user interface element is a filter icon or button, and wherein the dialog is a filter selection dialog.

In some embodiments of the computer system, the second set of information includes a presentation format for presenting information in the dialog.

In some embodiments of the computer system, first set of information is received via an API of the web application.

Some embodiments provide one or more non-transitory computer-readable medium storing computer program code. The computer program code comprising sets of instructions to execute a panel execution environment of a web application. The panel includes a first user interface element.

The computer program code further comprising sets of instructions to execute a dialog execution environment for a dialog in response to a selection of the first user interface element. The dialog execution environment receives a first set of information upon execution. The dialog includes a second user interface element selectable to show a second set of information where at least a portion of the second set of information is not included in the first set of information received upon execution. The first set of information including a callback method.

The computer program code further comprising sets of instructions to send, by the dialog execution environment, a first request for the second set of information to the panel execution environment via the callback method. The request sent in response to a selection of the second user interface element.

The computer program code further comprising sets of instructions to send, by the panel execution environment, a second request for the second set of information to a server.

The computer program code further comprising sets of instructions to receive, by the panel execution environment, a first response including the second set of information from the server.

The computer program code further comprising sets of instructions to receive, by the dialog execution environment, a second response including the second set of information from the panel execution environment.

The computer program code further comprising sets of instructions to provide, by the dialog execution environment, the second set of information in a user interface of the dialog.

In some embodiments of the one or more non-transitory computer-readable medium, the callback method includes one or more of a state, a store, and a services container.

In some embodiments of the one or more non-transitory computer-readable medium, the panel execution environment and the dialog execution environment are separate iFrames.

In some embodiments of the one or more non-transitory computer-readable medium, the dialog is a popup user interface element.

In some embodiments of the one or more non-transitory computer-readable medium, the first user interface element is a filter icon or button, and wherein the dialog is a filter selection dialog.

In some embodiments of the one or more non-transitory computer-readable medium, the second set of information includes a presentation format for presenting information in the dialog.

In some embodiments of the one or more non-transitory computer-readable medium, the first set of information is received via an API of the web application.

Some embodiments provide a computer-implemented method. The method comprises executing a panel execution environment of a web application. The panel including a first user interface element. The method further comprises executing a dialog execution environment for a dialog in response to a selection of the first user interface element. The dialog execution environment receiving a first set of information upon execution. The dialog including a second user interface element selectable to show a second set of information where at least a portion of the second set of information is not included in the first set of information received upon execution. The first set of information including a callback method.

The method further comprises sending, by the dialog execution environment, a first request for the second set of information to the panel execution environment via the callback method. The request sent in response to a selection of the second user interface element.

The method further comprises sending, by the panel execution environment, a second request for the second set of information to a server.

The method further comprises receiving, by the panel execution environment, a first response including the second set of information from the server.

The method further comprises receiving, by the dialog execution environment, a second response including the second set of information from the panel execution environment.

The method further comprises providing, by the dialog execution environment, the second set of information in a user interface of the dialog.

In some embodiments of the computer-implemented method, the callback method includes one or more of a state, a store, and a services container.

In some embodiments of the computer-implemented method, the panel execution environment and the dialog execution environment are separate iFrames.

In some embodiments of the computer-implemented method, wherein the dialog is a popup user interface element.

In some embodiments of the computer-implemented method, the first user interface element is a filter icon or button, and wherein the dialog is a filter selection dialog.

In some embodiments of the computer-implemented method, the second set of information includes a presentation format for presenting information in the dialog.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer system, comprising:
   one or more processors; and
   one or more machine-readable medium coupled to the one or more processors and storing computer program code comprising sets of instructions executable by the one or more processors to:

execute a panel execution environment of a web application, a panel including a first user interface element;

execute a dialog execution environment for a dialog in response to a selection of the first user interface element, the dialog execution environment receiving a first set of information upon execution, the dialog including a second user interface element selectable to show a second set of information, at least a portion of the second set of information not included in the first set of information received upon execution, the first set of information including a callback method;

send, by the dialog execution environment, a first request for the second set of information to the panel execution environment via the callback method, the request sent in response to a selection of the second user interface element;

send, by the panel execution environment, a second request for the second set of information to a server;

receive, by the panel execution environment, a first response including the second set of information from the server;

receive, by the dialog execution environment, a second response including the second set of information from the panel execution environment; and provide, by the dialog execution environment, the second set of information in a user interface of the dialog.

2. The computer system of claim 1, wherein the callback method includes one or more of a state, a store, and a services container.

3. The computer system of claim 1, wherein the panel execution environment and the dialog execution environment are separate iFrames.

4. The computer system of claim 1, wherein the dialog is a popup user interface element.

5. The computer system of claim 1, wherein the first user interface element is a filter icon or button, and wherein the dialog is a filter selection dialog.

6. The computer system of claim 1, wherein the second set of information includes a presentation format for presenting information in the dialog.

7. The computer system of claim 1, wherein the first set of information is received via an API of the web application.

8. One or more non-transitory computer-readable medium storing computer program code comprising sets of instructions to:

execute a panel execution environment of a web application, a panel including a first user interface element;

execute a dialog execution environment for a dialog in response to a selection of the first user interface element, the dialog execution environment receiving a first set of information upon execution, the dialog including a second user interface element selectable to show a second set of information, at least a portion of the second set of information not included in the first set of information received upon execution, the first set of information including a callback method;

send, by the dialog execution environment, a first request for the second set of information to the panel execution environment via the callback method, the request sent in response to a selection of the second user interface element;

send, by the panel execution environment, a second request for the second set of information to a server;

receive, by the panel execution environment, a first response including the second set of information from the server;

receive, by the dialog execution environment, a second response including the second set of information from the panel execution environment; and provide, by the dialog execution environment, the second set of information in a user interface of the dialog.

9. The non-transitory computer-readable medium of claim 8, wherein the callback method includes one or more of a state, a store, and a services container.

10. The non-transitory computer-readable medium of claim 8, wherein the panel execution environment and the dialog execution environment are separate iFrames.

11. The non-transitory computer-readable medium of claim 8, wherein the dialog is a popup user interface element.

12. The non-transitory computer-readable medium of claim 8, wherein the first user interface element is a filter icon or button, and wherein the dialog is a filter selection dialog.

13. The non-transitory computer-readable medium of claim 8, wherein the second set of information includes a presentation format for presenting information in the dialog.

14. The non-transitory computer-readable medium of claim 8, wherein the first set of information is received via an API of the web application.

15. A computer-implemented method, comprising:

execute a panel execution environment of a web application, a panel including a first user interface element;

executing a dialog execution environment for a dialog in response to a selection of the first user interface element, the dialog execution environment receiving a first set of information upon execution, the dialog including a second user interface element selectable to show a second set of information, at least a portion of the second set of information not included in the first set of information received upon execution, the first set of information including a callback method;

sending, by the dialog execution environment, a first request for the second set of information to the panel execution environment via the callback method, the request sent in response to a selection of the second user interface element;

sending, by the panel execution environment, a second request for the second set of information to a server;

receiving, by the panel execution environment, a first response including the second set of information from the server;

receiving, by the dialog execution environment, a second response including the second set of information from the panel execution environment; and providing, by the dialog execution environment, the second set of information in a user interface of the dialog.

16. The computer-implemented method of claim 15, wherein the callback method includes one or more of a state, a store, and a services container.

17. The computer-implemented method of claim 15, wherein the panel execution environment and the dialog execution environment are separate iFrames.

18. The computer-implemented method of claim 15, wherein the dialog is a popup user interface element.

19. The computer-implemented method of claim 15, wherein the first user interface element is a filter icon or button, and wherein the dialog is a filter selection dialog.

20. The computer-implemented method of claim 15, wherein the second set of information includes a presentation format for presenting information in the dialog.

* * * * *